(12) United States Patent
Langegger et al.

(10) Patent No.: US 11,067,018 B2
(45) Date of Patent: Jul. 20, 2021

(54) METHOD FOR REGENERATING AN OTTO PARTICLE FILTER OF AN INTERNAL COMBUSTION ENGINE OF A VEHICLE

(71) Applicant: Dr. Ing. h.c. F. Porsche Aktiengesellschaft, Stuttgart (DE)

(72) Inventors: Michael Langegger, Kornwestheim (DE); Michael Reinhardt, Neulingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 25 days.

(21) Appl. No.: 16/371,142

(22) Filed: Apr. 1, 2019

(65) Prior Publication Data

US 2020/0018252 A1 Jan. 16, 2020

(30) Foreign Application Priority Data

Apr. 3, 2018 (DE) .......................... 102018107769.6

(51) Int. Cl.

| F02D 41/02 | (2006.01) |
| F02D 13/02 | (2006.01) |
| F02D 41/00 | (2006.01) |
| F02D 41/04 | (2006.01) |

(52) U.S. Cl.
CPC ....... *F02D 41/029* (2013.01); *F02D 13/0219* (2013.01); *F02D 41/0087* (2013.01); *F02D 41/04* (2013.01)

(58) Field of Classification Search
CPC ............ F01N 2430/00; F01N 2900/08; F01N 2900/1602; F01N 2900/1606; F01N 3/023; F01N 9/00; F01N 9/002; F02D 13/0219; F02D 17/02; F02D 41/0087; F02D 41/024; F02D 41/029; F02D 41/04
See application file for complete search history.

(56) References Cited

U.S. PATENT DOCUMENTS

| 8,131,445 | B2 * | 3/2012 | Tripathi | .............. | F02D 41/1401 |
| | | | | | 701/102 |
| 9,394,837 | B2 * | 7/2016 | Ulrey | ................. | F02D 41/0087 |
| 10,309,329 | B2 * | 6/2019 | Tsunoda | ................ | B60W 10/04 |
| 2010/0326403 | A1 * | 12/2010 | Gonze | .................. | F01N 13/009 |
| | | | | | 123/436 |
| 2011/0041815 | A1 * | 2/2011 | Henriksson | ............. | F02B 37/24 |
| | | | | | 123/564 |

(Continued)

FOREIGN PATENT DOCUMENTS

| DE | 102011007364 A1 | 10/2012 |
| DE | 102011056657 A1 | 3/2013 |

(Continued)

*Primary Examiner* — Anthony Ayala Delgado
(74) *Attorney, Agent, or Firm* — Leydig, Voit & Mayer, Ltd.

(57) ABSTRACT

A method for regenerating an Otto particle filter of an internal combustion engine of a vehicle includes identifying a loading state of the Otto particle filter above a regeneration threshold and operating the internal combustion engine in a heating mode for the purposes of heating the Otto particle filter to a temperature threshold. The method further includes switching a first cylinder of the internal combustion engine from a fuel supply to an air supply, and continuing to operate at least one further cylinder of the internal combustion engine with the fuel supply.

17 Claims, 2 Drawing Sheets

(56) References Cited

U.S. PATENT DOCUMENTS

| | | | |
|---|---|---|---|
| 2011/0072787 A1* | 3/2011 | Hubbard | F02D 41/029 60/276 |
| 2011/0120090 A1 | 5/2011 | Sorensen, Jr. | |
| 2012/0260631 A1 | 10/2012 | Winkler et al. | |
| 2012/0285139 A1* | 11/2012 | Geyer | F01N 9/007 60/274 |
| 2013/0060446 A1 | 3/2013 | Kim et al. | |
| 2013/0061573 A1* | 3/2013 | In | F02D 41/0087 60/274 |
| 2013/0095013 A1* | 4/2013 | Banno | B01J 21/04 423/213.5 |
| 2013/0110383 A1* | 5/2013 | McDonald | F02D 41/042 701/113 |
| 2014/0041362 A1* | 2/2014 | Ulrey | F02D 41/0087 60/274 |
| 2016/0115887 A1* | 4/2016 | Tsunooka | F02D 17/04 60/274 |
| 2016/0222898 A1* | 8/2016 | Ulrey | F01N 9/002 |
| 2018/0347434 A1* | 12/2018 | Michel | F01N 11/00 |
| 2019/0345857 A1* | 11/2019 | Rollinger | F01N 3/025 |
| 2020/0018252 A1* | 1/2020 | Langegger | F02D 17/02 |

FOREIGN PATENT DOCUMENTS

| | | |
|---|---|---|
| DE | 102011057117 A1 | 3/2013 |
| DE | 102012022153 A1 | 5/2014 |
| DE | 102014016700 A1 | 5/2016 |

\* cited by examiner

METHOD FOR REGENERATING AN OTTO PARTICLE FILTER OF AN INTERNAL COMBUSTION ENGINE OF A VEHICLE

CROSS REFERENCE TO RELATED APPLICATIONS

This application claims benefit to German Patent Application No. DE 10 2018 107 769.6, filed Apr. 3, 2018, which is hereby incorporated by reference herein.

FIELD

The present invention relates to a method for regenerating an Otto particle filter of an internal combustion engine of a vehicle, and to a control device for carrying out such a method.

BACKGROUND

It is known that vehicles with internal combustion engines have devices for the aftertreatment of the exhaust gas of the internal combustion engine. In particular in order to prevent soot particles from emerging into the surroundings, Otto particle filters are known in the case of internal combustion engines, which filters capture the soot particles in the exhaust gas of the internal combustion engine and prevent them from emerging into the surroundings. Such Otto particle filters thus become blocked with individual soot particles over the course of time, and the loading state increases. As soon as an excessively high loading state of the Otto particle filter has been reached, the function of the filtering of the exhaust gas can no longer be performed, or can be performed only inadequately. At this time at the latest, a regeneration or an exchange of the Otto particle filter is necessary in order to keep the exhaust gas of the internal combustion engine within the standard limits prescribed for it.

A disadvantage in the case of the known solutions is that, in the presence of a high loading state, Otto particle filters either must be exchanged or else should be regenerated during the operation of the vehicle. The exchange of an Otto particle filter involves a corresponding workshop visit and the costs for this exchange. This, too, leads to increased material consumption, because a new Otto particle filter is required as a replacement. A regeneration during the ongoing operation of the vehicle may duly lengthen the service life of the Otto particle filter, but is associated with poorer operation and thus with corresponding inefficiency in the regeneration and in operation during the regeneration phase.

SUMMARY

In an embodiment, the present invention provides a method for regenerating an Otto particle filter of an internal combustion engine of a vehicle. The method includes identifying a loading state of the Otto particle filter above a regeneration threshold, operating the internal combustion engine in a heating mode for the purposes of heating the Otto particle filter to a temperature threshold, switching a first cylinder of the internal combustion engine from a fuel supply to an air supply, and continuing to operate at least one further cylinder of the internal combustion engine with the fuel supply.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
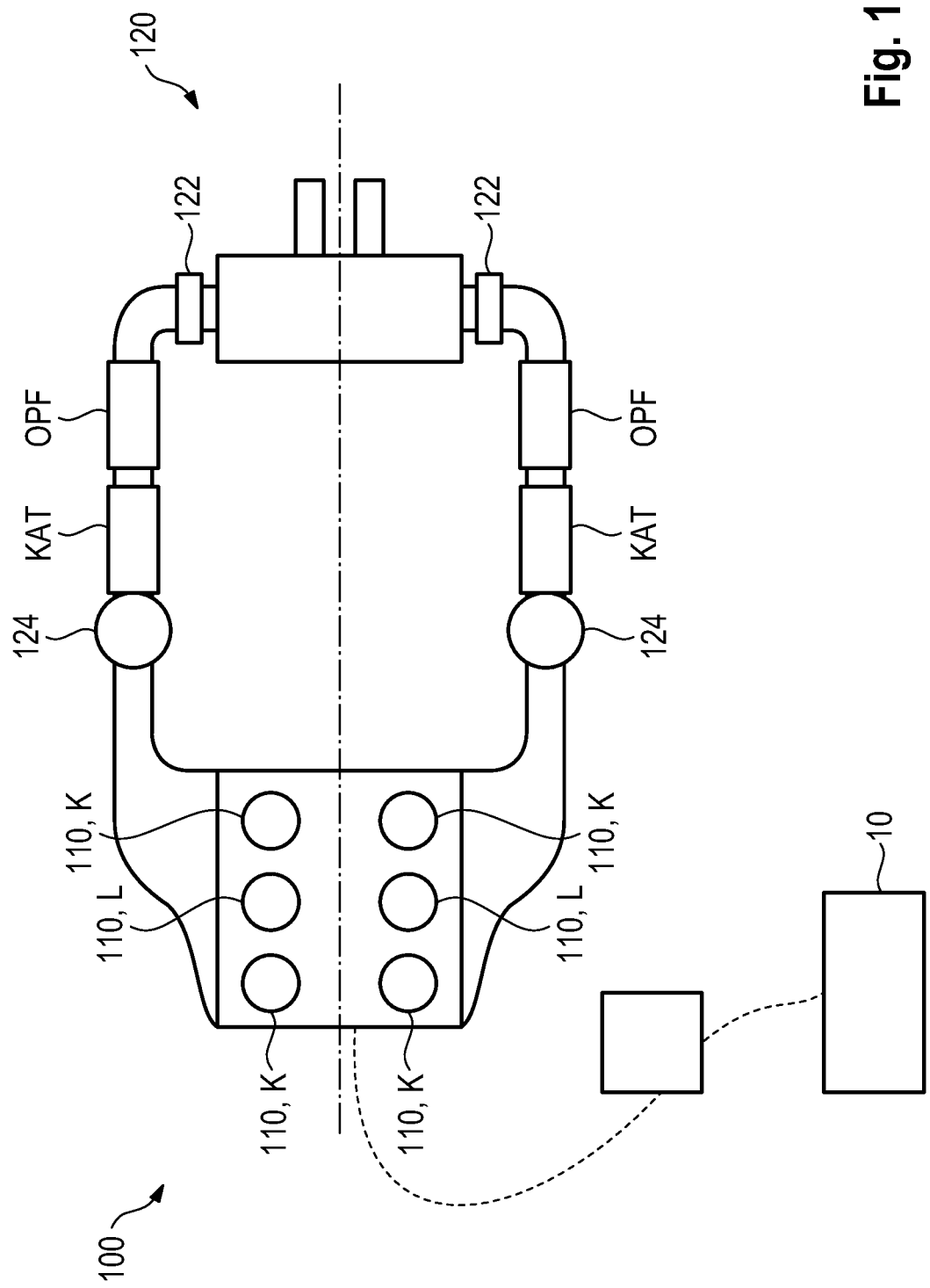
FIG. 1 shows an internal combustion engine for carrying out a method according to an embodiment of the invention.

Embodiments of the present invention provide certain advantages over known solutions and lengthen the service life of an Otto particle filter in an inexpensive and simple manner.

In the following description, features and details which are described in conjunction with methods according to the invention also apply in conjunction with control devices according to the invention and vice versa in each case, and therefore reference is always or can always be made from one to the other in respect of the disclosure of the individual aspects of the invention.

The invention relates to a method for regenerating an Otto particle filter of an internal combustion engine of a vehicle. For this purpose, a method according to the invention has the following steps: identifying a loading state of the Otto particle filter above a regeneration threshold, operating the internal combustion engine in a heating mode for the purposes of heating the Otto particle filter to a temperature threshold, switching at least one cylinder of the internal combustion engine from a fuel supply to an air supply, and continuing to operate at least one cylinder of the internal combustion engine with a fuel supply.

A method according to the invention is performed in particular when the vehicle is at a standstill on a vehicle stand. When the vehicle is at a standstill, it is possible in particular for the heating mode and the regeneration mode to be provided without influence on driving operation of the vehicle that would otherwise be present.

A method according to the invention starts by virtue of the overshooting of a regeneration threshold being identified through monitoring of the loading state of the Otto particle filter. This regeneration threshold is preferably provided with a buffer in relation to the functional limit of the Otto particle filter. Thus, as soon as the loading state has become so great that the functionality of the Otto particle filter is impaired or jeopardized, the regeneration threshold is identified as having been overshot. When the vehicle is at a standstill, for example on a vehicle stand in a workshop, the regeneration can then be started.

To carry out the regeneration, the loading state of the Otto particle filter must be reduced. It is sought to achieve this by combustion or catalytic combustion. To be able to provide this, it is necessary in a first step for the Otto particle filter to be brought to a corresponding minimum temperature in order to be able to provide the combustion of the soot particles stored in the Otto particle filter. This attainment of a temperature threshold in the form of the minimum temperature occurs in the heating mode and in a corresponding operating condition of the internal combustion engine. The possibilities for making this heating mode faster and more efficient will be discussed in more detail further below.

The temperature threshold is to be understood here to mean the temperature, or the temperature range, above which the regeneration process in the form of the catalytic or free combustion of the soot particles in the Otto particle filter becomes possible. It is self-evidently also possible for a further increase in the temperature, and thus an acceleration of the regeneration process or a more efficient combustion of the soot particles, to occur during the course of the regeneration.

To permit the catalytic or free combustion of the soot particles for the regeneration of the Otto particle filter, a supply of oxygen is necessary. Aside from a targeted supply of oxygen from an oxygen bottle, the ambient air may also be used as oxygen-containing gas. To avoid a separate connection of a corresponding oxygen supply, a switch of at least one cylinder of the internal combustion engine from a fuel supply to an air supply is performed after the temperature threshold has been reached. This is to be understood to mean that operation is performed in the normal mode, with a fuel supply to the cylinder. In other words, fuel is injected as a fuel mixture into the internal combustion engine and compressed in the cylinder until an ignition occurs, which forces the piston of the cylinder in the opposite direction again. If the fuel supply is deactivated and a switch is made to air supply, then only air, and no longer fuel mixture, is introduced into the cylinder. This has the effect that said cylinder no longer provides a power output, but is rather driven concomitantly as a passive cylinder by the other cylinders which remain active. In other words, said cylinder is switched from the power mode to the pump mode, and then pumps air from the surroundings into the downstream exhaust tract of the exhaust system. To provide this pump functionality, at least one of the further cylinders of the internal combustion engine continues to be operated with a fuel supply, such that a corresponding engine torque continues to be provided, and in particular can provide the power required for the pump mode with air supply to the switched cylinder.

By virtue of the fact that at least one cylinder is now operated with an air supply, which cylinder is driven by the at least one other cylinder with a fuel supply, oxygen-containing gas in the form of ambient air can ingress into the heated Otto particle filter. The combination of high temperature above the temperature threshold, on the one hand, and the air oxygen supplied by the switched cylinder, on the other hand, has the effect that a free or catalytic combustion of the soot particles present in the Otto particle filter can now occur here. This mode with switched cylinder with an air supply and cylinder which continues to be operated with a fuel supply may also be referred to as regeneration mode, and has the effect that, by means of the regeneration mode, the loading state of the Otto particle filter with soot particles is reduced through the combustion of said particles.

It is also to be pointed out that the switching of the at least one cylinder from fuel supply to air supply self-evidently corresponds with the actual design, specific to the vehicle, of the exhaust system. If this is for example a two-tract exhaust system with, correspondingly, also two separate Otto particle filters, then the switching for each separate tract and for each separate Otto particle filter will also be performed for a separate specific cylinder. In the case of a six-cylinder engine which has a dedicated Otto particle filter for in each case three cylinders, it is correspondingly necessary for one dedicated cylinder to be switched to air supply for each Otto particle filter. Thus, in this case, of the six cylinders, two cylinders are operated with an air supply, and four cylinders continue to be operated with a fuel supply.

The above steps are carried out in particular for a complete or substantial regeneration in the regeneration mode. It is self-evidently possible for parts of the individual steps, or else the entire method, to be capable of being carried out in automated or substantially automated fashion. If a yet further catalytic converter is connected upstream of an Otto particle filter, then a regeneration mode for catalytic aftertreatment of the fuel may also be provided there. The same also applies if no catalytic converter is provided, but rather the corresponding catalytic coating is part of the Otto particle filter.

It may be advantageous if, in a method according to the invention, in the heating mode of the internal combustion engine, at least one of the following measures is implemented: adjustment of the camshaft, adaptation of the fuel injection, adaptation of the ignition angle during the fuel injection, dethrottling of the internal combustion engine, and closure of an exhaust-gas flap.

The above enumeration is not an exhaustive list. It is self-evidently also possible for two or more of the above measures to be used in combination in order to make the heating mode more efficient and/or accelerate said heating mode. Here, a dethrottling of the internal combustion engine is to be understood for example to mean a corresponding rearrangement of a turbocharger or exhaust-gas recirculation system. It is accordingly possible for so-called bypass paths, wastegates or else variable turbine geometries to be rearranged in order to accelerate the heating mode or make said heating mode more efficient.

It may likewise be advantageous if, in a method according to the invention, the heating mode of the internal combustion engine is maintained after the temperature threshold has been reached. This means that post-heating or further heating is provided in the regeneration mode. Here, the heating mode may be continued uniformly or with reduced outlay. A lowering of the temperature after the temperature threshold has been reached, and thus during the course of the regeneration mode, can thus be prevented in an effective manner. In particular, the heating mode is carried out with ongoing monitoring of the temperature of the internal combustion engine or of the Otto particle filter.

A further advantage can be achieved if, in a method according to the invention, the internal combustion engine is operated with increased engine rotational speed after the temperature threshold has been reached. In particular, the engine rotational speed is increased in relation to the engine rotational speed in the heating mode. This may be provided for example by means of an increased target value preset for the engine rotational speed of the internal combustion engine. An increased rotational speed leads, owing to the unchanging geometry of the individual cylinders, in particular to an increased and enlarged mass flow of air in the pump mode of the cylinder with an air supply. Thus, by means of the enlarged mass flow, the rate of regeneration can also be increased, and the regeneration time required for the regeneration of the Otto particle filter can be reduced.

It may furthermore be advantageous if, in a method according to the invention, after the switching of the at least one cylinder to an air supply, the cylinders that remain with a fuel supply are operated with a richer fuel mixture. Here, a richer fuel mixture is to be understood in particular to mean a fuel-air mixture which has more fuel for the same quantity of air, such that, as a result of the enrichment of the fuel mixture, even in the case of a constant engine rotational speed or in the case of a slightly increased engine rotational speed, it is made possible for the torque provided to be maintained or even increased by the internal combustion engine. By virtue of at least one of the cylinders being operated with an air supply, the required pump functionality and the corresponding friction conditions must be provided by the remaining cylinders, which continue to be operated, with a fuel supply. There is thus altogether a remaining positive torque at the internal combustion engine, such that the regeneration mode can be brought to an end in an effective manner.

It may likewise be advantageous if, in a method according to the invention, at least the steps of operating the internal combustion engine in a heating mode, of switching at least one cylinder and of continuing to operate at least one cylinder are performed when the vehicle is at a standstill, in particular on a vehicle stand in a workshop. This is to be distinguished in particular from normal driving operation of the vehicle. In particular, all of the steps are carried out when the vehicle is at a standstill. An impairment of the driving operation can thus be omitted, and it is in particular possible for the method according to the invention to lead to a regeneration of the Otto particle filter in an automated manner whilst other servicing and maintenance work is performed on the vehicle.

It may furthermore be advantageous if, in a method according to the invention, for the identification of the loading state of the Otto particle filter, a loading model is used, with which measured values of the Otto particle filter are compared. This involves in particular a pressure difference of the gas pressure upstream of the Otto particle filter and downstream of the Otto particle filter. The higher the loading state of the Otto particle filter is, the greater will be the pressure loss owing to the reduced flow cross section situation within the Otto particle filter. Because this relationship is normally non-linear, the use of a loading model which is provided as a simulation model or as a result of corresponding measured values on the test stand can provide the identification step easily and inexpensively for the method according to the invention.

It is furthermore advantageous if, in a method according to the invention, after the identification of the loading state of the Otto particle filter, at least one boundary condition is also checked for the execution of the regeneration, in particular one of the following boundary conditions: vehicle is situated on a vehicle stand, readout and/or checking of the fault memory of the vehicle, and connection to an external exhaust system. The above enumeration is not an exhaustive list. Through the checking of at least one further boundary condition, an unnecessary or false regeneration is avoided. For example, in the correlation with the readout of the fault memory of the vehicle, it is possible to prevent a falsely identified loading state of the Otto particle filter from leading to the regeneration mode in an undesired manner. It is also possible to avoid a situation in which the vehicle is not on a vehicle stand but is in normal driving operation when the regeneration mode is to be activated.

It is likewise advantageous if, in a method according to the invention, during the regeneration of the Otto particle filter, the at least one switched cylinder is switched back from the air supply to the fuel supply, whilst a further cylinder is switched from the fuel supply to the air supply. It is thus for example possible for switching of the cylinder between pump mode and normal combustion mode to be provided in a rotating manner. In particular, here, it is always the case that two cylinders overlap during the switch to an air supply, in order to be able to ensure a continuous or substantially continuous feed of oxygen-containing air in the regeneration mode. The switching may be performed in a manner controlled by means of sensors or on the basis of a fixed switching time period.

The present invention likewise relates to a control device for carrying out a method according to the invention. Such a control device has an identification module for identifying a loading state of the Otto particle filter above a regeneration threshold. Furthermore, a heating module is provided for operating the internal combustion engine in a heating mode for the purposes of heating the Otto particle filter to a temperature threshold. Furthermore, the control device has a regeneration module for switching at least one cylinder of the internal combustion engine from a fuel supply to an air supply, and for continuing to operate at least one cylinder of the internal combustion engine with a fuel supply. The control device thus provides the same advantages as have been discussed in detail with regard to a method according to the invention.

FIG. 1 schematically illustrates an internal combustion engine 100 with in this case six cylinders 110. A separate tract of an exhaust system 120 is provided for in each case three of the cylinders 110 of the internal combustion engine 100. To be able to ensure the aftertreatment of the exhaust gases of the individual cylinders 110, in this case, a catalytic converter KAT and an Otto particle filter OPF is provided for each exhaust tract in the exhaust system 120.

For a regeneration of the Otto particle filter OPF, the following approach is now taken. In a first step, the loading state of the Otto particle filter OPF can be identified, and in particular the correlation in the event of overshooting of a regeneration threshold. Thus, if a regeneration must be performed owing to an excessively high loading state of the Otto particle filter OPF, the vehicle is advantageously at a standstill, in particular on a vehicle stand in a workshop.

Figure 2:
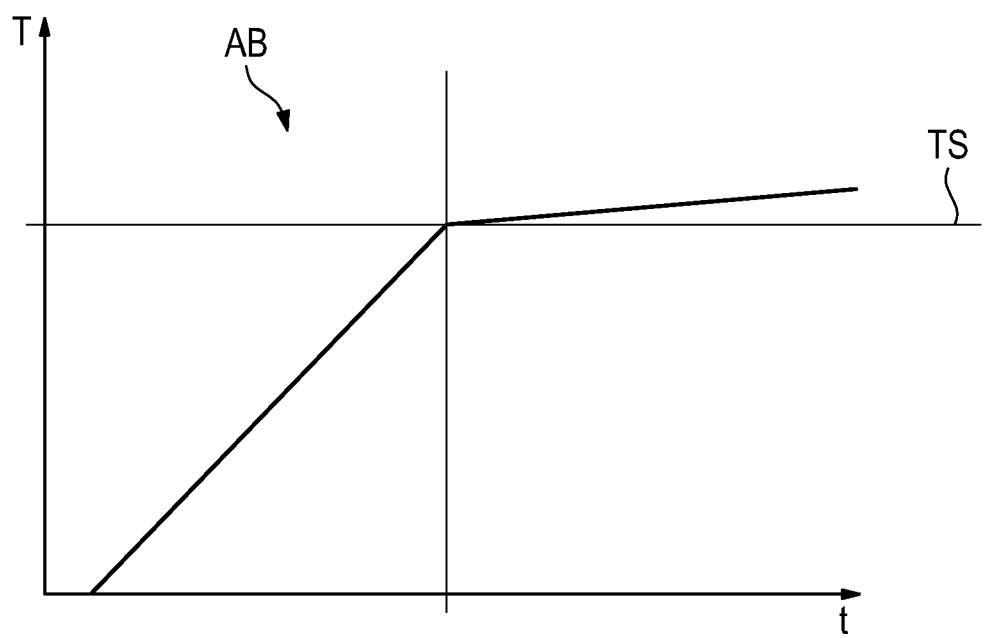
FIG. 2 shows a temperature situation over the course of a method according to an embodiment of the invention.
Figure 3:
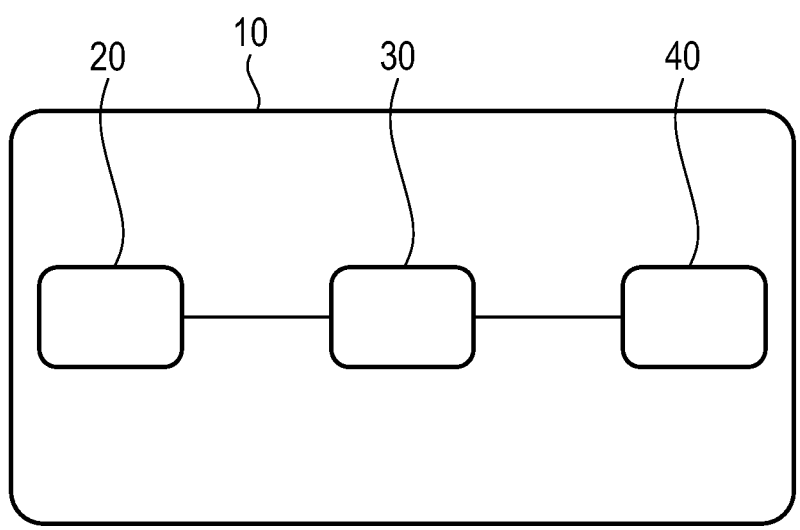
FIG. 3 shows a control device according to an embodiment of the invention.

The regeneration method can now be performed by means of the control device 10 as schematically illustrated in FIG. 3. The control device 10 includes an identification module 20 for identifying a loading state of the Otto particle filter above a regeneration threshold, a heating module 30 for operating the internal combustion engine in a heating mode AB for the purposes of heating the Otto particle filter OPF to a temperature threshold (TS), and a regeneration module 40 for switching at least one cylinder of the internal combustion engine from a fuel supply to an air supply. Heating in a heating mode AB is performed in the first step, as is also shown in FIG. 2. Here, the heating relates to the corresponding temperature of the Otto particle filter OPF. To be able to provide the required temperature and heat for this heating step, the internal combustion engine 100 is operated normally with all cylinders 110. This means that all cylinders 110, or in particular the majority of the cylinders 110, are operated with a fuel supply K, that is to say are fired with a fuel-air mixture, in order, by means of the controlled combustion in the cylinder 110, to provide the desired torques and, through the waste heat, the desired heating of the Otto particle filter OPF.

As soon as, as per FIG. 2, a temperature threshold TS has been reached after a corresponding heating phase of the heating mode AB has expired, said heating mode AB can be deactivated or can be at least partially continued. The temperature at the Otto particle filter OPF is now high enough to carry out the regeneration mode. For this, however, the supply of oxygen is required in addition to the required temperature. To ensure this, it is now the case that, for each exhaust tract of the exhaust system 120 as per FIG. 1, one of the in each case three cylinders 110 is switched from fuel supply K to air supply L. This means that no further fuel mixture is injected into these two cylinders 110 that have been switched to air supply L, with said cylinders rather, in a type of pump mode, conveying ambient air into the exhaust tract of the exhaust system 120. Owing to the high temperature at the Otto particle filter OPF and the quantity of air oxygen provided in this way, an oxidation or a combustion of the soot particles and thus a regeneration of the Otto particle filter OPF occur.

Numerous possibilities can be used here for the heating mode AB. These include inter alia also the closing of an exhaust-gas flap 122 and/or the closing of a wastegate valve 124.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for regenerating an Otto particle filter of an internal combustion engine of a vehicle, the method comprising:
    determining that a loading state of the Otto particle filter is above a regeneration threshold,
    heating the Otto particle filter to a minimum threshold temperature by operating the internal combustion engine in a heating mode,
    switching, in response to a temperature of the Otto particle filter reaching or exceeding the minimum threshold temperature, an operation of a first cylinder of the internal combustion engine from a normal mode to a pump mode by deactivating a fuel supply to the first cylinder so that only air is introduced into the cylinder, wherein the temperature of the Otto particle filter is maintained at or above the minimum threshold temperature during the operation of the first cylinder in the pump mode, and
    continuing to operate at least a second cylinder of the internal combustion engine with the fuel supply.

2. The method as claimed in claim 1, wherein in the heating mode of the internal combustion engine, at least one of the following measures is implemented:
    adjustment of a camshaft,
    adaptation of a fuel injection,
    adaptation of an ignition angle during the fuel injection,
    dethrottling of the internal combustion engine, and
    closure of an exhaust-gas flap.

3. The method as claimed in claim 1, wherein the heating mode of the internal combustion engine is maintained after the temperature of the Otto particle filter has reached or exceeded the minimum threshold temperature.

4. The method as claimed in claim 1, wherein the internal combustion engine is operated with an increased engine rotational speed after the temperature of the Otto particle filter has reached or exceeded the minimum threshold temperature.

5. The method as claimed in claim 1, wherein, after the switching the operation of the first cylinder from the normal mode to the pump mode, the second cylinder is operated with a richer fuel mixture.

6. The method as claimed in claim 1, further comprising, before the determining that the loading state of the Otto particle filter is above a regeneration threshold, determining that the vehicle is at a standstill, wherein the operating the internal combustion engine in the heating mode, the switching the operation of the first cylinder from the fuel supply to the air supply, and the continuing to operate the second cylinder are performed when the vehicle is at the standstill.

7. The method as claimed in claim 1, wherein the determining that the loading state of the Otto particle filter is above a regeneration threshold includes comparing measured values of the Otto particle filter with a loading model.

8. The method as claimed in claim 1, wherein, after the determining that the loading state of the Otto particle filter is above the regeneration threshold, at least one boundary condition also checked for the execution of the regeneration, the at least one boundary condition including one or more of:
    the vehicle is situated on a vehicle stand,
    readout and/or checking of the fault memory of the vehicle, and
    connection to an external exhaust system.

9. The method as claimed in claim 1, wherein, during regeneration of the Otto particle filter, the operation of the first cylinder is switched back from the pump mode to the normal mode by reconnecting the fuel supply, and the operation of the second cylinder is switched from the normal mode to the pump mode.

10. The method as claimed in claim 9, wherein the operation of the first cylinder in the pump mode and the operation of the second cylinder in the pump mode occur simultaneously during an overlap period.

11. The method as claimed in claim 10, wherein at least a third cylinder of the internal combustion engine is operated in the normal mode during the overlap period so as to provide power necessary to drive the first cylinder and the second cylinder in the pump mode.

12. A control device configured to perform the method of claim 1 for regenerating the Otto particle filter of the internal combustion engine.

13. The method as claimed in claim 1, wherein, in the pump mode, the first cylinder pumps ambient air into a downstream exhaust tract of an exhaust system in which the Otto particle filter is disposed.

14. The method as claimed in claim 13, wherein, during regeneration of the Otto particle filter, cylinders of the internal combustion engine that are not operated in the normal mode only provide ambient air into the downstream exhaust tract of the exhaust system in which the Otto particle filter is disposed.

15. The method as claimed in claim 13, wherein the Otto particle filter includes a catalytic coating, and wherein the downstream exhaust tract of the exhaust system in which the Otto particle filter is disposed includes no separate catalytic converter.

16. The method as claimed in claim 1, wherein the operating the internal combustion engine in the heating mode comprises rearranging a flow path through a turbocharger or an exhaust-gas recirculation system.

17. The method as claimed in claim 1, wherein the minimum threshold temperature is a temperature at which catalytic and/or free combustion of soot particles in the Otto particle filter takes place.

* * * * *